Dec. 1, 1970   R. M. TIMMS   3,544,158
BICYCLE INFANT CARRIER MEANS
Filed July 8, 1968   2 Sheets-Sheet 1

INVENTOR.
RICHARD M. TIMMS
BY John R. Walker, III
Attorney

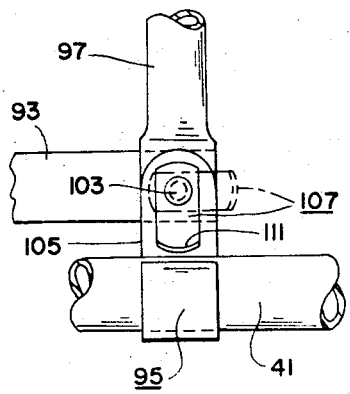
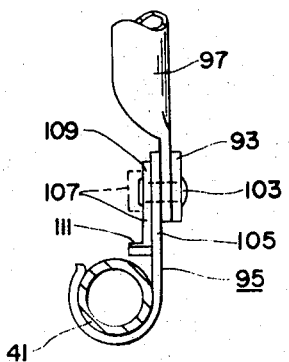
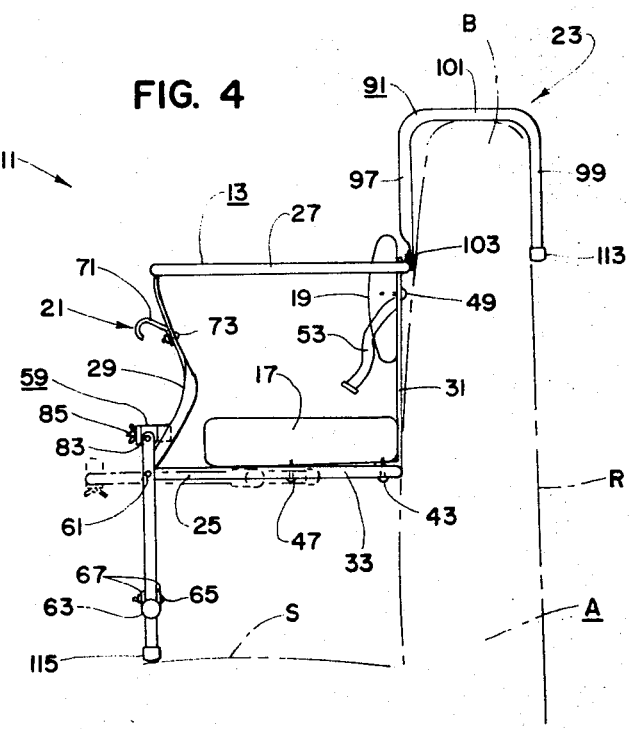

United States Patent Office 3,544,158
Patented Dec. 1, 1970

3,544,158
BICYCLE INFANT CARRIER MEANS
Richard M. Timms, Memphis, Tenn., assignor to Troxel Manufacturing Company, Moscow, Tenn.
Filed July 8, 1968, Ser. No. 743,145
Int. Cl. A47d 1/10
U.S. Cl. 297—254                                      7 Claims

ABSTRACT OF THE DISCLOSURE

Infant carrier apparatus is disclosed which is adapted optionally to be arranged on the steering handlebar structure of a bicycle or adapted to be supported on the front side of an automobile seat backrest. The carrier includes hook means arranged on the forward portion thereof adapted to be hooked over the handlebar of the bicycle and supported cantilever fashion rearwardly of the bicycle handlebar. For automobile use, the inventive structure includes a pair of hooks adapted to hook over the upper brim portion of the seat back and to support the rearward part of the carrier from the seat back. For automobile use the carrier structure also includes foldable leg-like yoke means adapted to be arranged vertically with the lower terminal portions of said leg-like members resting on the automobile horizontal seat. The carrier is adapted to be simultaneously supported on both the seat and back part of an automobile seat.

BACKGROUND OF THE INVENTION

Field of the invention

The invention relates to infant carriers adapted for use in riding an infant on a bicycle or in an automobile. The invention particularly relates to dual use infant carrier structures adapted selectively to be supported on a bicycle or in an autombile.

Description of the prior art

Many infant carriers or child seats have heretofore been designed for use of bicycles or for automobiles. However, to my knowledge there has not been contemplated or designed a child seat or carrier for use optionally in either an automobile or bicycle. Pat. Nos. 503,170 and 556,951 each disclose auxiliary or child seat means adapted to be supported cantilever fashion rearwardly of a bicycle handlebar. Also, there are currently available many infant seats adapted to be supported on the front side of an automobile seat back rest. Nothwithstanding the above comments, there does not seem to be currently available a dual use type infant carrier adapted to be optionally used for riding an infant in an automobile or on a bicycle.

SUMMARY OF THE INVENTION

The infant carrier structure of the present invention may be readily mounted on either an automobile or a bicycle; the carrier structure may be quickly and easily mounted on or removed from a bicycle or an automobile. The infant carrier includes a horizontally circumferentially configured rim which provides safety means for properly securing the infant in the carrier seat. The carrier structure also includes seat belt safety means for properly securing the infant in the carrier structure of the invention. The carrier structure is collapsible or foldable into a compact and readily portable configuration. It is readily adjustable and may be quickly and easily adjusted to substantially any make or model automobile or bicycle.

The present invention provides convenient means whereby an infant may be transported in a car to a location for riding bicycles, as for example from home to a distant park. It will be understood that the bicycle may be carried on a rack on the automobile or inside, as for example when a station wagon is used. Then, at the destination, while the infant remains in the carrier, it may be removed from the car seat and placed on the bicycle, ready for the bicycle ride. Also, the hanger assembly for supporting the carrier from the automobile seat may be removed and folded to a compact size for placing in the glove compartment of the automobile.

BRIEF DESCRIPTION OF THE DRAWING

FIG. 4 is a side elevational view of the carrier structure of the invention shown mounted on an automobile seat.

FIG. 5 is a fragmentary front elevational view of a portion of the hanger assembly adapted for mounting the carrier on an automobile.

FIG. 6 is a vertical plane view taken as from the right of FIG. 5.

DESCRIPTION OF THE PREFERRED EMBODIMENT

Figure 1:
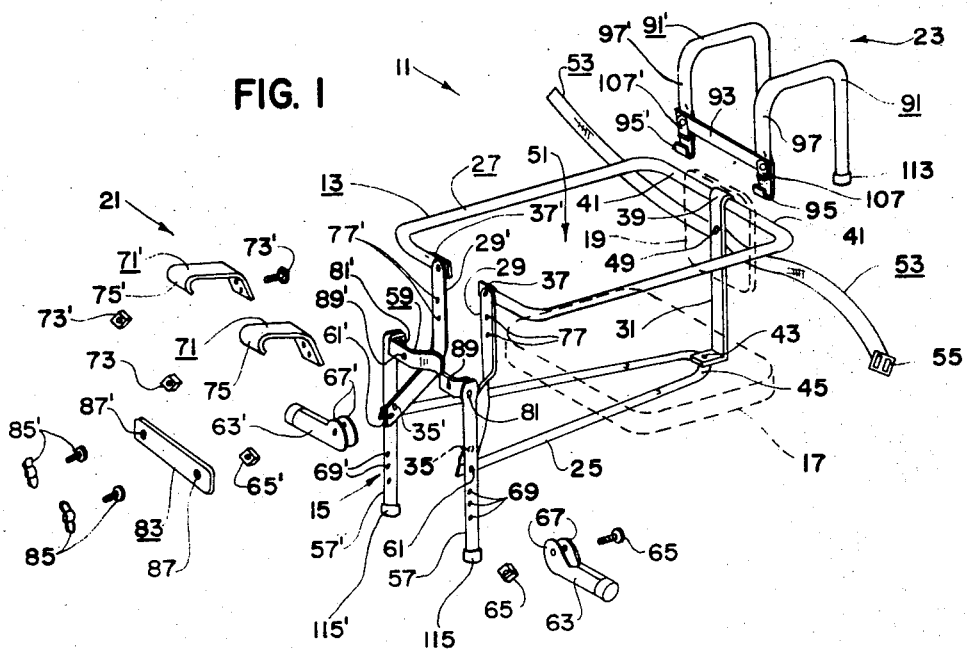
FIG. 1 is an exploded perspective view of the infant carrier structure of the present invention.
Figure 2:
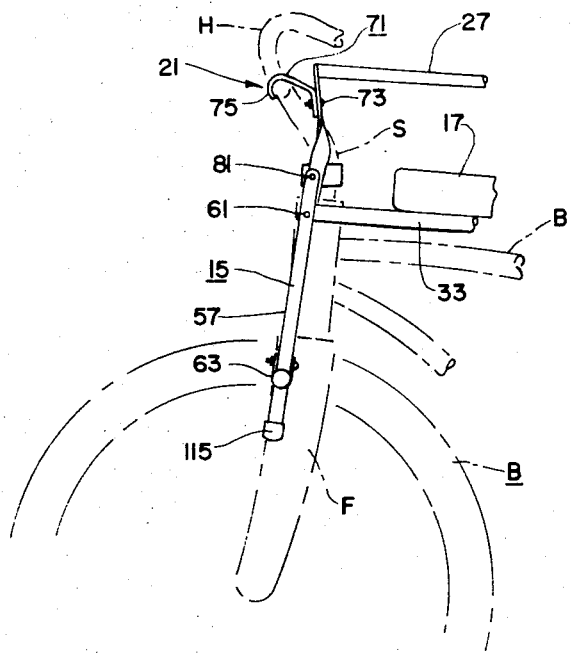
FIG. 2 is a side elevational view of the forward portion of the carrier structure and illustrated mounted on a bicycle.
Figure 3:
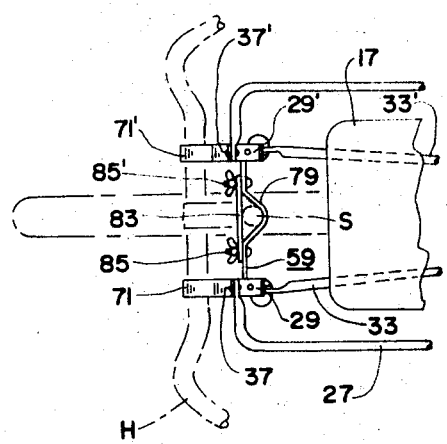
FIG. 3 is a top plan view of FIG. 2.

The infant carrier structure of the invention is indicated by numeral 11 and basically includes a frame 13 of openwork construction; an inverted U-shaped yoke 15 pivotally secured on the forward portion of frame 13; padding means including seat and back pads 17, 19; hook means 21 adapted for supporting carrier frame 13 from a bicycle (indicated B); and a hanger assembly 23 adapted for supporting carrier frame 13 from an automobile seat assembly (indicated A).

Frame 13 basically includes a horizontal U-shaped base part 25; a generally rectangular tube-formed rim 27 parallel spaced above base 25; and forwardly and rearwardly arranged upright members 29, 29' and 31 interconnecting respectively the forward and rearward portions of base 25 and rim 27. The forward end portions respectively of oppositely arranged extension portions 33, 33' of base 25 and rim 27 are rigidly interconnected by pair of upright members 29, 29' secured by horizontally extending rivets 35, 35', 37, 37' extending respectively through opposite end portions of upright members 29, 29' and forward end portions of base 25 and rim 27. Left and right upright members 29, 29' preferably are each formed of strapstock and each twisted 90° along a medial portion thereof and each is preferably curved slightly forwardly at the lower end portion. Rearward upright 31 preferably is formed of strap material with its upper portion 39 looped and welded to the medial portion of rim rearward portion 41. The lower end of upright member 31 is right angularly formed forwardly and is fixedly secured by a screw 43 to bend portion 45 of base 25. Base 25, rim 27, and upright members 29, 29', 31 are rigidly interconnected and define openwork frame 13. Threaded fasteners 47, 49 extending respectively through base 25 and upright member 33 firmly secure respetcively seat pads 17, 19 within the interior 51 of frame 13. A safety strap 53 having buckle means 55 is preferably clampingly secured between back pad 19 and upright member 31 at its medial portion and provides safety strap means for securing an infant in interior 51 of frame 13.

Inverted U-shaped yoke 15 basically includes vertically parallel arranged left and right reach elements 57, 57' and a horizontally extending bight element 59 pivotally secured on opposite end portions to the upper end portions of reach elements 57, 57'. Aligned rivets 61, 61' extending respectively through the upper medial portions of yoke reach elements 57, 57′ and the lower end portions respectively of upright frame members 29, 29′ and the forward end portions of extensions portions 33, 33′ pivotally secure yoke 15 on the lower forward portion of frame 13. Yoke 15 is adapted to be folded bidirectionally forwardly and rearwardly respectively between a stopped in-use generally vertical disposition and a generally horizontal stored disposition underneath frame 13 (see FIG. 4).

All of the distal ends of the bolt members holding carrier 11 together preferably extend outwardly away from the child being supported in the carrier for safety reasons.

Footrest spurs 63, 63′ are pivotally supported respectively on the lower portions of left and right yoke reach elements 57, 57′. Threaded fasteners 65, 65′ extending through upwardly offset tab portions 67, 67′ arranged on the proximal end portions of footrest spurs 63, 63′ pivotally secure the footrest spurs at vertically adjustable positions on reach elements 57, 57′. Spurs 63, 63′ each are adapted to be folded upwardly from a stopped horizontal disposition to a vertical disposition arranged parallel along respective reach portions 57, 57′. Vertically spaced adjustment apertures 69, 69′ diametrically formed respectively in reach portions 57, 57′ provide vertical adjustment means for footrest spurs 63, 63′.

Hook means 21 of infant carrier 11 is adapted for use in supporting the carrier frame from handlebars H of bicycle B: hook means including a left and a right hook element 71, 71′ are adjustably secured respectively by fasteners 73, 73′ on the upper portions respectively of upright members 29, 29′. The downturned upper end portions 75, 75′ respectively of hook elements 71, 71′ are adapted to hook over oppositely projecting handlebar portions of handlebar H and support carrier frame 13 cantilever fashion. Vertically spaced apertures 77, 77′ formed respectively in upper portions of upright frame members 29, 29′ provide vertical adjustment means respectively for hook elements 71, 71′ and provide vertical adjustment means for accommodating carrier 11 for a particular bicycle handlebar arrangement.

Horizontal bight element 59 of inverted U-shaped yoke 15 preferably includes a rearwardly deflected semi-circular abutment portion 79 adapted to abuttingly engage the backward side of handlebar stem S. Carrier frame 13 is adapted to be supported rearwardly of bicycle handlebar H cantilever fashion with yoke bight abutment portion 79 being fulcrumed against the backward side of handlebar stem S, and with the reach portions 57, 57′ extending adjacent opposite sides of front wheel forked portion F of the bicycle in line therewith so that the front wheel of the bicycle can be fully turned without the carrier 11 hitting the horizontal bar B of the bicycle, as was the problem with some of the other prior carriers. Aligned rivet 81, 81′ extending respectively through opposite end portions of yoke bight element 59 and through respectively upper end portions of frame upright members 29, 29′ support yoke bight element 59 and permit the bight element to pivotally shift to accommodate the handlebar stem of a particular bicycle.

The oppositely arranged backward side surfaces of bight element 59 are adapted to abuttingly engage forwardly facing longitudinally medial portions respectively of frame upright members 29, 29′ and provide stop means for limiting the outward pivotal movement of yoke reach elements 57, 57′ (for limiting the clockwise movement of the yoke members as seen in FIG. 4). An elongated abutment plate 83 is adapted to detachably bridge semicircular abutment portion 79 of bight element 59 and to removably embrace the handlebar stem in the concave enclosure of yoke bight element 59. Wingnut type bolt means 85, 85′ extending respectively through abutment plate aperture 87, 87′ and yoke bight element apertures 89, 89′ are adapted to clampingly secure the abutment plate and the yoke bight element and removably secure frame 13 on the handlebar assembly of the bicycle.

Hanger assembly 23 is adapted for use in supporting carrier frame 13 on automobile seat assembly A. Hanger assembly 23 basically include a pair of vertically parallel arranged inverted U-shaped hanger elements 91, 91′; a horizontal spanner bar 93 articulatingly connecting hanger elements 91, 91′; and a pair of resilient clip members 95, 95′ adapted to frictionally engage oppositely projecting tubular portions of carrier frame rearward rim portion 41 (see FIGS. 1 and 4–6). Hanger elements 91, 91′ are adapted to snugly engage brim B of seat backrest R with vertically extending proximal and distal extension 97, 97′; 99, 99′ and horizontally extending medial extensions 101, 101′ snugly engaging the upper portion of seat backrest R. Pivot rivets 103, 103′ extending horizontally respectively through proximal extensions 97, 97′ of hanger elements 91, 91′; opposite end portions of spanner bar 93; and the upper proximal end portions 105, 105′ of U-shaped clip members 95, 95′ articulatingly secure respectively hanger elements 91, 91′, spanner bar 93, and clip members 95, 95′ in an assembly (see FIGS. 1, 5 and 6).

Carrier frame 13 is adapted to be detached from automobile seat mounting hanger assembly 23 by lifting upwardly on carrier frame 13 and disengaging tubular rim portion 41 of the frame from upwardly opening U-shaped clip members 95, 95′. When hanger assembly 23 is disengaged, it may be folded in a compact form for shipment or storage, as for example in the glove compartment as heretofore mentioned. To fold assembly 23 the hanger elements 91, 91′ are pivoted inwardly about the rivets 103, 103′ so that the hanger elements are in overlapping relationship and are substantially parallel with spanner bar 93.

The clip members 95, 95′ are preferably formed of high carbon spring steel stock and configured to circumferentially resiliently frictionally embrace carrier frame rearward rim portion 41 (see FIG. 6) so that they will snap into place on the rim portion. Tab-like turnlock elements 107, 107′ preferably are provided for preventing carrier frame rim 41 from inadvertent disengagement from clip members 95, 95′ (see FIG. 6). Hanger assembly rivets 103, 103′ preferably pivotally secure turnlock elements 107, 107′; rivets 103, 103′ extend through thin base portions 109, 109′ of turnlock elements 107, 107′ and turnably support the elements against the forward face of clip member vertical proximal portion 105, 105′. Elements 107, 107′ each include a locking edge 111, 111′ arranged radially distant respectively from pivot rivets 103, 103′. Locking edges 111, 111′ each are bent right angularly from base portion 109, 109′ and are adapted to abuttingly engage the upper cylindrical surface of tubular rim portion 41 of frame 13. Turnlock elements 107, 107′ are adapted to be turned approximately 90° for permitting frame rim portion 41 to be removed upwardly from the upwardly opening openings of clip members 95, 95′. Turnlock elements 107, 107′ are adapted to be turned with locking edge 111, 111′ downwardly and thereby prevent upward passage of frame rim portion 41 from the clip members or the locking edge may be turned upwardly, thereby permitting upward movement and disengagement of frame rim 41 from the clip member (see FIGS. 5 and 6).

Plastic caps 113, 113′ preferably are frictionally fitted respectively on the downturned distal extensions 99, 99′ of hanger elements 91, 91′. In like manner, hollow plastic caps 115, 115′ preferably are frictionally fitted on the bottom terminal portions respectively of reach elements 57, 57′ of yoke 15. The vertical extensions respectively of yoke reach elements 57, 57′ preferably are long enough so that when carrier structure 11 is supported on an automobile seat, the lower terminal end portions, or caps 115, 115′ of yoke 15 restingly engage the horizontal upwardly facing surface of automobile seat S. When carrier 11 is supported on an automobile seat assembly, the rearward part of the carrier frame is supported by hanger assembly 23 and the forward part of the carrier frame is supported by yoke reach cap elements 115, 115' restingly engaging the upwardly facing seat cushions of the automobile.

While I have shown and described a preferred embodiment of the present invention, it will be understood that various changes and modifications in structure may be made without departing from the spirit and scope of the invention as defined in the claims.

I claim:

1. Infant carrier means selectively adapted to be supported on a bicycle or in an automobile comprising frame means having forward and rearward portions including a horizontal base, a horizontally configured rim having forward and rearward portions, a front pair of upright members including a left and a right upright member, and at least one rear upright member, said forward and rearward upright members rigidly interconnecting respectively forward and rearward portions of said base and said rim, said frame structure defining substantially an upwardly oriented interior adapted to receive the infant, inverted U-shaped yoke means including a parallel pair of reach elements including a left and a right reach element arranged in a generally vertical plane, and including a horizontal bight element having opposite end portions interconnecting respectively upper portions of said left and right reach elements, means pivotally securing said yoke means on the forward portion of said frame on a horizontal axis arranged at the upper medial portions respectively of said pair of yoke reach elements, said yoke being adapted to be folded bidirectionally forwardly and rearwardly respectively between a stopped in-use generally vertical disposition and a generally horizontal stored disposition arranged underneath said frame, left and right footrest spurs secured on and projecting oppositely horizontally cantilever fashion respectively from said left and right yoke reach portions, padding means supported on and arranged in the interior of said frame adapted to cushion the ride of the infant, means for detachably supporting said carrier frame on the handlebar-handlebar stem assembly of said bicycle including hook means including a left and a right hook element fixedly secured respectively on said left and right upright members of said frame and with said left and right hook elements each including a downturned upper end portion adapted respectively to hook over oppositely projecting left and right portions of the bicycle handlebar, and including abutment means including a forwardly facing abutment portion medially arranged relative to the longitudinal extension of said bight element and adapted to abuttingly engage the backward side of said handlebar stem, said frame being adapted to be supported rearwardly of said bicycle handlebar in cantilever fashion with said left and right hook elements being hooked over the horizontal left and right handlebar portions and with the yoke bight abutment portion being fulcrumed against the backward side of said handlebar stem, and including a hanger assembly for detachably supporting said carrier frame on the backrest of an automobile seat including a pair of inverted U-shaped vertically parallel arranged hanger elements each of a size adapted to snugly fit side by side over the upper rim portion of the automobile seat back and including an elongate horizontal spanner, means connecting the forward end portions respectively of said left and right hanger elements on opposite end portions of said spanner, and including left and right upwardly opening U-shaped clip members, each having a proximal portion secured respectively on the opposite end portions of said spanner and with said left and right clip members being of a size adapted for simultaneously frictionally engaging opposite left and right portions of said rearward portion of said frame rim, said carrier frame being adapted to be detached from said automobile seat mounting hanger means by frictionally disengaging said rearward portion of said frame rim from the clips of said hanger assembly.

2. The infant carrier means of claim 1 wherein said left and right footrest spurs each are pivotally supported on a lower portion respectively of said left and right yoke reach portions and with each spur being pivoted on a fore and aft extending axis and such axis being upwardly offset from the horizontal major axis of said spur, said left and right footrest spurs being adapted to be moved between a horizontal stopped in-use disposition and a vertical retracted disposition with a respective spur parallel engaging a respective yoke reach portion.

3. The infant carrier means of claim 1 wherein said yoke bight abutment portion is generally semi-circular and defines a semi-circular concave abutment surface adapted to abuttingly engage the backward surface of said bicycle handlebar stem and with said reach elements extending adjacent opposite sides of the front wheel forked portion of the bicycle and which additionally includes horizontal retainer plate means adapted to bridge said semi-circular abutment portion of said yoke bight portion and including threaded fastener means removably securing said retainer bar bridgingly over said concave semicircular abutment portion, said retainer plate being adapted to be bridgingly secured over a bicycle stem received in the abutment portion of said yoke bight portion for preventing disengagement of the infant carrier frame from the bicycle and said retainer plate being adapted to be disengaged from said yoke bight portion for affording disengagement of said carrier from said bicycle.

4. The infant carrier means of claim 1 wherein said bight element of said inverted U-shaped yoke means is pivotally secured respectively at its opposite end portion to the upper end portions of said left and right reach elements and pivotable on a common horizontal axis.

5. The infant carrier means of claim 1 wherein said hanger assembly for detachably supporting said carrier frame on an automobile seat backrest additionally includes selectively operative locking means for locking said rearward portion of said frame rim securely in said left and right clip members for preventing disengagement of said frame rim rearward portion from the clip members of said hanger assembly.

6. The infant carrier means of claim 5 wherein said locking means of said hanger assembly arranged for locking the carrier frame rim on the clip members includes left and right turnlock elements turnably supported substantially at the upwardly opening opening of each clip member and respectively in face to face engagement with the proximat extension respectively of said left and right clip member, each turnlock element having a locking edge arranged radially distant from its pivot center; each turnlock element being adapted to be turnably manipulated for arranging the locking edge downwardly and substantially into engagement with the carrier frame rim thereby preventing upward passage of said rim from said clip member or said turnlock elements each being adapted to be turned with the locking edge arranged upwardly and thereby permitting upward movement and disengagement of said frame rim from said hanger assembly.

7. Infant carrier means selectively adapted to be supported on a bicycle or in an automobile comprising frame means defining an upwardly oriented interior adapted to receive the infant, yoke means attached to said frame means and including an abutment portion and right and left reach portions, footrest portions supported from said reach portions, hook means attached to said frame; said frame being adapted to be supported cantilever fashion with said hook means being hooked over the handlebars of the bicycle and with said abutment portion being in abutment with the backside of the handlebar stem of the bicycle, and with said reach portions extending adjacent opposite sides of the front wheel forked portion of the bicycle; hanger means removably attached to said frame for supporting said frame on the backrest of an automobile; and means pivotally attaching said yoke means to said frame means for movement of said yoke means between a substantially vertical position and a substantially horizontal position adjacent the underside of said frame.

References Cited
UNITED STATES PATENTS

| | | | |
|---|---|---|---|
| 551,068 | 12/1895 | Wilson | 280—202 |
| 556,951 | 3/1896 | Williams et al. | 280—202 |
| 843,094 | 2/1907 | Paterson et al. | 280—202 |
| 1,591,536 | 7/1926 | Lake | 280—202 |
| 2,805,704 | 9/1957 | Avseev | 297—255 |
| 2,994,557 | 8/1961 | King | 297—130 |

FOREIGN PATENTS

| | | |
|---|---|---|
| 157,989 | 2/1957 | Sweden. |
| 841,410 | 6/1952 | Germany. |

FRANCIS K. ZUGEL, Primary Examiner

U.S. Cl. X.R.

280—202